Oct. 19, 1926.

J. E. HARRIS

SHOCK ABSORBER

Filed April 4, 1925   2 Sheets-Sheet 1

1,603,597

WITNESSES
C. L. McDonald
E. N. Lovewell

INVENTOR
J. E. Harris
BY
ATTORNEY

Oct. 19, 1926.

J. E. HARRIS

SHOCK ABSORBER

Filed April 4, 1925    2 Sheets-Sheet 2

1,603,597

WITNESSES
C. L. McDonald
E. N. Lovewell

INVENTOR
J. E. Harris
BY
ATTORNEY

Patented Oct. 19, 1926.

1,603,597

UNITED STATES PATENT OFFICE.

JOHN ELMER HARRIS, OF KINGFISHER, OKLAHOMA.

SHOCK ABSORBER.

Application filed April 4, 1925. Serial No. 20,724.

This invention relates to a shock absorber or snubber, which is adapted to be attached to an automobile, either at the front or rear, in such a manner as to reduce the shock and the effect of the rebound. It comprises an elastic band, which is comparatively short and thick, so as to be capable of withstanding a great amount of tensional force, yet yields sufficiently to ease the shock. The invention also includes fittings of special design upon which the elastic bands are mounted, and by means of which they are operatively connected to the parts to be cushioned, so as to produce the most effective results.

The invention will be more particularly described in connection with the accompanying drawings, which illustrate a practical manner in which the same may be used.

Figure 1:
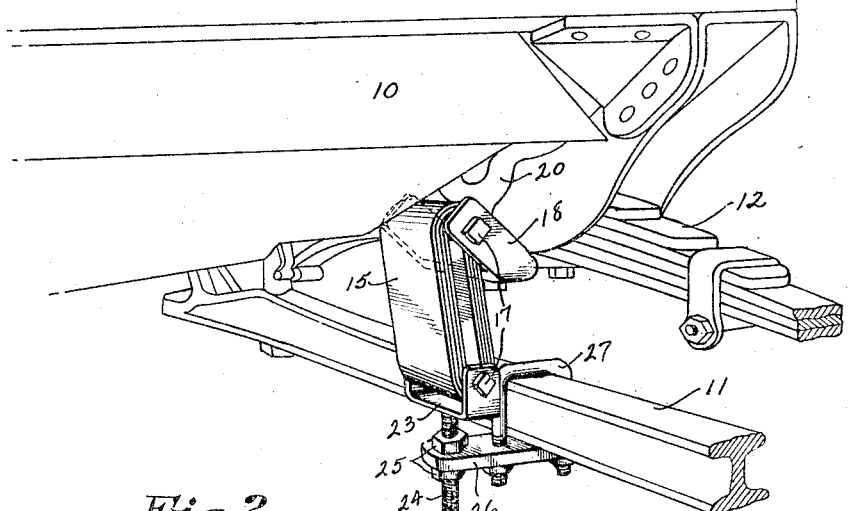
Figure 1 is a perspective view illustrating the application of the invention to the front end of the automobile.
Figure 4:
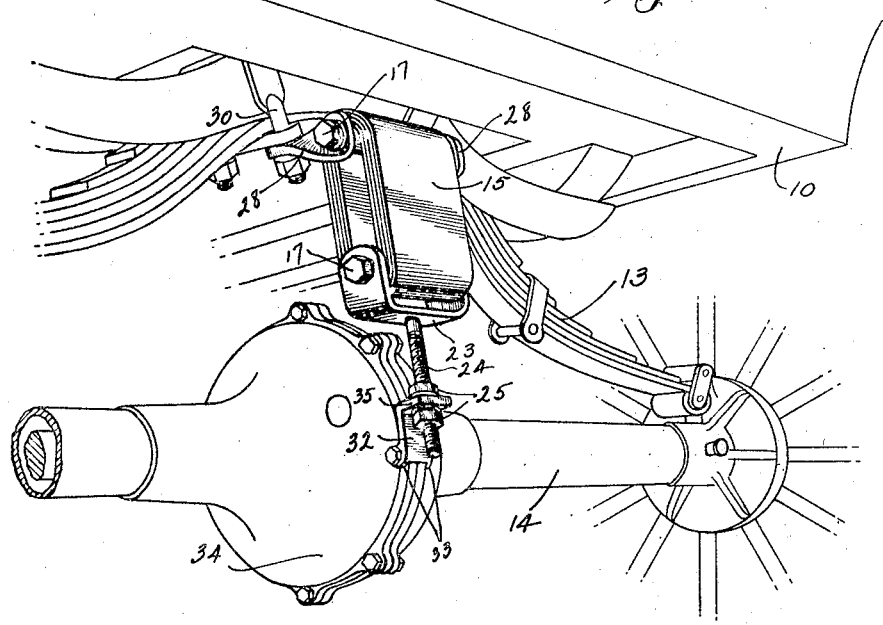
Figure 4 is a perspective view illustrating the invention attached to the rear end of an automobile.
Figure 5:
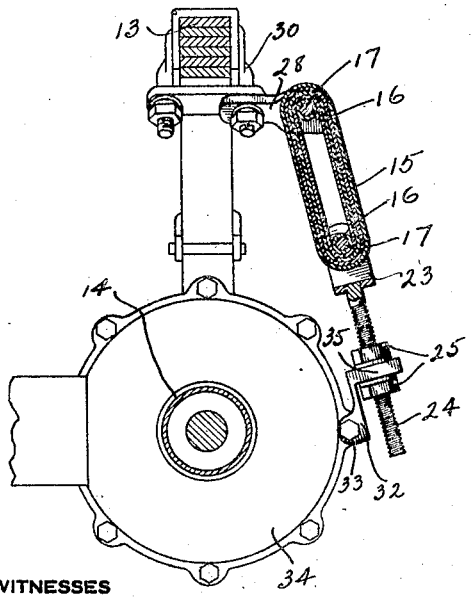
Figure 5 is a vertical section through the invention as used in Figure 4.
Figure 6:
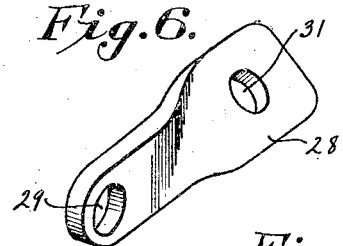
Figure 6 is a perspective view of one of the fittings used in Figures 4 and 5.
Figure 7:
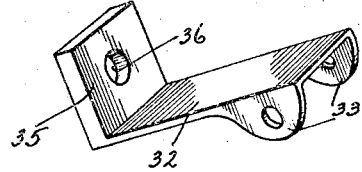
Figure 7 is a perspective view of one of the fittings adapted to be attached to the differential housing.

The automobile body 10, as illustrated in Figure 1, is supported at each side of its forward end from a longitudinal rail 11, by means of a leaf spring 12. The rear end of the body 10, as shown in Figure 4, is supported by means of a leaf spring 13 from the rear axle housing 14.

The device which constitutes the present invention comprises an elastic band 15, which is comparatively short and thick, and is preferably made from several plies of rubber. This band passes over a pair of sleeves or rollers 16, respectively supported on spindles 17 which, in the present embodiment, are in the form of bolts.

Figure 2:
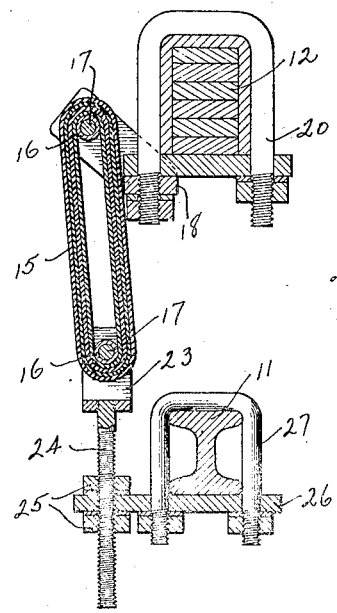
Figure 2 is a vertical section through the invention and the parts to which it is attached in Figure 1.
Figure 3:
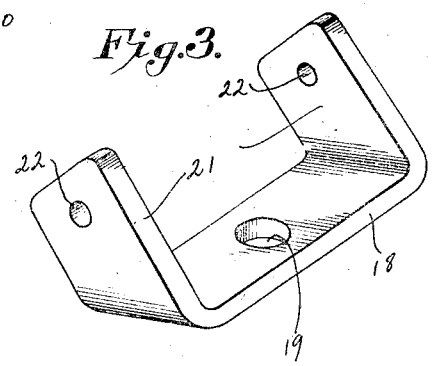
Figure 3 is a perspective view of one of the fittings used in Figures 1 and 2.

When applied to the front end of the automobile, as shown in Figures 1, 2 and 3, the upper spindle or bolt 17 is secured in a fitting 18, which is in the form of a yoke having a central opening 19 adapted to be secured to one end of the spring shackle 20. The arms 21 of the yoke are inclined laterally, and provided with openings 22 for receiving the bolt. The lower spindle or bolt 17 is similarly supported in the opposed arms of a yoke 23, which is provided centrally with an integral, downwardly extending threaded stem 24. This stem is secured by means of lock nuts 25 to the projecting portion of a plate 26, which is adapted to be secured by means of a U-shaped bolt or shackle 27 to the rail 11 of the running gear.

In adapting the attachment to the rear end of the automobile, as shown in Figures 4 to 7 inclusive, a similar band 15 and yoke 23 are used. The upper bolt 17, in this case, is supported at each end by a fitting 28, which is provided at one end with an opening 29 for receiving one end of the shackle 30, which embraces the rear spring 13. The outer end of the fitting 28 is twisted, so as to bring it into a vertical plane, and is provided with an opening 31 for receiving the end of the bolt 17. The stem 24 of the yoke 23 is, in this case, secured to a fitting 32, which is formed with one or more pairs of ears 33, adapted to be secured by bolts which secure the differential housing 34. The fitting 32 has an angularly projecting portion 35 provided with an opening 36 adapted to receive the stem 24, which is adjustably secured therein by means of the lock nuts 25.

In attaching the invention to the automobile, it is only necessary to remove a few nuts, and to replace the same after the respective fittings 18, 26, 28 and 32 have been placed in position. The band 15 may be easily connected to the respective fittings by removing and replacing the bolts 17. After the snubbers have been attached, the tension may be adjusted by a manipulation of the nuts 25. Generally, the best results are obtained when the tension is adjusted to approximately 250 pounds.

The invention is herein illustrated as attached to a Ford automobile, but it is obvious that with slight modifications the invention may be adapted to fit any type of automobile, and in fact may be used wherever it is desired to cushion the recoil between two members. The invention, therefore, includes all such modifications as fall within the scope of the appended claims.

What is claimed is:

1. A shock absorber comprising an elastic band, a pair of spaced members about which the band passes, devices for supporting said members respectively from parts whose relative movement is to be cushioned, one of said devices including a yoke having arms between which the respective member is secured, and threaded means for adjusting said yoke to vary the tension of the band.

2. A shock absorber comprising an elastic band, a pair of spaced spindles about which the band passes, a device for securing one of said spindles to an automobile spring, and another device for securing the other spindle to the differential housing, the last-mentioned device being adjustable in length to vary the tension of the band.

3. A shock absorber comprising an elastic band, a pair of spaced spindles about which the band passes, means for securing one of said spindles to an automobile spring, a yoke in which the other spindle is mounted, said yoke having a central stem, and a fitting in which said stem is mounted for longitudinal adjustment, said fitting being formed with a pair of spaced ears adapted to straddle the rim of a differential housing and provided with alined openings for receiving one of the bolts which secure the parts of the differential housing together.

In testimony that I claim the foregoing as my own, I have hereto affixed my signature.

JOHN ELMER HARRIS.